United States Patent [19]

Sakakibara et al.

[11] Patent Number: 5,153,912
[45] Date of Patent: Oct. 6, 1992

[54] DATA COMMUNICATION APPARATUS

[75] Inventors: Kenzo Sakakibara, Yokohama; Takehiro Yoshida, Tokyo; Kozo Toda, Yokohama, all of Japan

[73] Assignee: Canon Kabushiki Kaisha, Tokyo, Japan

[21] Appl. No.: 670,461

[22] Filed: Mar. 13, 1991

Related U.S. Application Data

[63] Continuation of Ser. No. 471,004, Jan. 25, 1990, abandoned, which is a continuation of Ser. No. 165,477, Mar. 8, 1988, abandoned.

[30] Foreign Application Priority Data

Mar. 11, 1987 [JP] Japan .............................. 62-057673
Mar. 11, 1987 [JP] Japan .............................. 62-057674

[51] Int. Cl.$^5$ ............................................. H04N 1/32
[52] U.S. Cl. ............................. 379/100; 379/96; 358/400; 358/436
[58] Field of Search ......................... 379/96-98, 379/100; 358/400, 403, 407, 434, 435, 436, 438, 468

[56] References Cited

U.S. PATENT DOCUMENTS

| | | | |
|---|---|---|---|
| 3,803,360 | 4/1974 | Morstadt | 379/157 |
| 3,889,057 | 6/1975 | Perreault et al. | 358/257 |
| 3,962,534 | 6/1976 | Ogawa | 379/100 |
| 4,340,783 | 7/1982 | Sugiyama et al. | 379/98 |
| 4,353,097 | 10/1982 | Takeda et al. | 379/100 |
| 4,502,080 | 2/1985 | Tsuda | 358/256 |
| 4,524,244 | 6/1985 | Faggin et al. | 379/96 |
| 4,567,322 | 1/1986 | Tsuda | 379/100 |
| 4,584,434 | 4/1986 | Hashimoto | 379/100 |
| 4,660,218 | 4/1987 | Hashimoto | 379/93 |
| 4,677,660 | 6/1987 | Yoshida | 379/100 |
| 4,723,172 | 2/1988 | Matsumoto | 358/256 |
| 4,727,576 | 2/1988 | Yoshida | 379/100 |
| 4,773,080 | 9/1988 | Nakajima et al. | 379/100 |
| 4,794,637 | 12/1988 | Hashimoto | 379/100 |
| 4,800,439 | 1/1989 | Yoshino | 379/100 |
| 4,815,121 | 3/1989 | Yoshida | 379/100 |
| 4,868,865 | 9/1989 | Ogawa et al. | 379/100 |
| 4,879,741 | 11/1989 | Liu | 379/100 |

FOREIGN PATENT DOCUMENTS

| | | | |
|---|---|---|---|
| 0044850 | 3/1983 | Japan | 379/100 |
| 0044851 | 3/1983 | Japan | 379/94 |
| 60-214676 | 10/1985 | Japan | 379/100 |
| 2183427 | 6/1987 | United Kingdom | 379/100 |

Primary Examiner—James L. Dwyer
Assistant Examiner—Wing F. Chan
Attorney, Agent, or Firm—Fitzpatrick, Cella, Harper & Scinto

[57] ABSTRACT

A data transmission apparatus includes a facsimile section for performing data transmission, at least one multifunction telephone set terminal for performing speech communication, a switching circuit for switching the facsimile section and the multifunction telephone set terminal, and a microcomputer for detecting whether transmission data is set in the facsimile section. The switching circuit switches a transmission line from the multifunction telephone set terminal to the facsimile section when the microcomputer detects that the transmission data is stored in the facsimile section while the multifunction telephone set terminal is engaged with the transmission line.

72 Claims, 5 Drawing Sheets

DATA COMMUNICATION APPARATUS

This application is a continuation of application Ser. No. 471,004 filed Jan. 25, 1990 (abandoned) which is a continuation of application Ser. No. 165,477 filed Mar. 8, 1988 now abandoned.

BACKGROUND OF THE INVENTION

5. FIELD OF THE INVENTION

The present invention relates to a data communication apparatus having a speech communication function and a data communication function.

2. Related Background Art

A facsimile system is known as an apparatus of this type. In the facsimile system, a telephone line is switched to the facsimile or telephone set side to perform image data communication or speech communication. When a start key in the facsimile system is depressed to perform image communication, the transmission line is switched from the telephone set to the facsimile system, and communication is started. In other words, in a conventional facsimile system, the start key must be depressed to start facsimile communication.

In recent years, there has become available is a communication system including one facsimile system and a plurality of telephone sets, all of which are commonly connected to a communication line. Examples of such a communication system are described in U.S. Ser. No. 108,915 (filed on Oct. 15, 1987) and U.S. Ser. No. 106,783 (filed on Oct. 13, 1987) by the present applicant. In the above-mentioned system, a plurality of operators share one facsimile system, and therefore, the facsimile system is located at a place remote from the telephone sets (i.e., operators). For this reason, U.S. Ser. No. 108,915 describes an arrangement in which a facsimile system can be operated from each telephone set, and U.S. Ser. No. 106,783 describes an arrangement in which an operating state of a facsimile system is displayed on each telephone set. In a communication system in which, particularly, one facsimile system and a plurality of telephone sets share a communication line, since the facsimile system must be operated at a remote area, it is inconvenient for each operator to operate the start key of the remote facsimile system every time image communication is required. Prior art systems in which a plurality of telephone sets and a facsimile system are selectively switched with respect to a plurality of communication lines are described in U.S. Ser. No. 813,514 (filed on Dec. 26, 1985) and U.S. Pat. No. 823,286 filed on Jan. 28, 1986). Arrangements in which the number of keys in the facsimile system is decreased are described in U.S. Pat. No. 4,502,080 and U.S. Pat. No 4,567,322. U.S. Pat. No. 4,502,080 describes an arrangement in which transmission, reception, and copying can be selectively performed by a single key. U.S. Pat. No. 4,567,322 describes an arrangement in which transmission, reception, copying, and recording paper cutting can be performed by a single key.

SUMMARY OF THE INVENTION

It is an object of the present invention to eliminate the conventional problems described above.

It is another object of the present invention to improve a data communication apparatus.

It is still another object of the present invention to allow data communication without depression of a start key of the data communication apparatus. It is still another object of the present invention to perform data communication if transmission data is set in line connection with a partner.

It is still another object of the present invention to perform data communication if transmission data is set in detection of a response from a partner.

It is still another object of the present invention to provide a communication system including a data communication apparatus and a plurality of speech communication apparatuses, all of which are connected to a common transmission line, wherein data communication can be performed without depressing a start key in the data communication apparatus.

The above and other objects, features, and advantages of the present invention will be apparent from the detailed description of preferred embodiments in conjunction with the accompanying drawings.

DETAILED DESCRIPTION OF THE PREFERRED EMBODIMENTS

Preferred embodiments of the present invention will be described with reference to the accompanying drawings.

Figure 1:
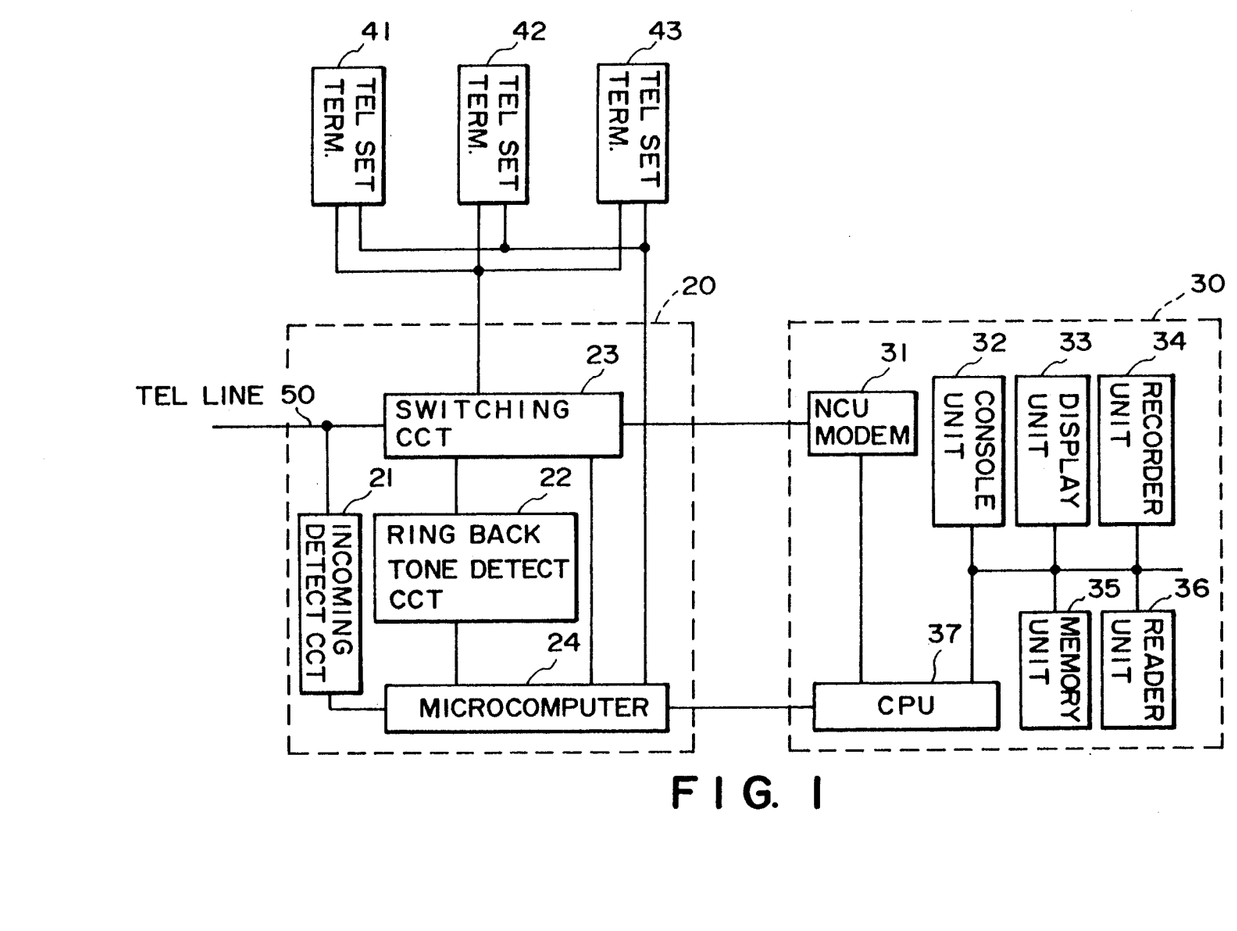
FIG. 1 is a block diagram of a data communication apparatus according to a first embodiment of the present invention.

FIG. 1 is a block diagram of a data communication apparatus according to a first embodiment of the present invention.

A non-telephone terminal comprises a line control section 20 and a facsimile section 30. A plurality of telephone set terminals 41, 42, and 43 can be connected to the control section 20. The number of telephone set terminals may be arbitrarily determined.

The line control section 20 includes an incoming detector circuit 21, a ring back tone detector circuit 22, a switching circuit 23, and a microcomputer 24. The ring back tone detector circuit 22 serves as a ring back tone detecting means for detecting a ring back tone from the reception side.

The facsimile section 30 includes an NCU/modem 31, a console unit 32, a display unit 33, a recorder unit 34, a memory unit 35, a reader unit 36, and a CPU 37.

The reader unit 36 reads a transmission original and detects that the transmission original is set in a non-telephone terminal. The reader unit 36 serves as a transmission original detecting means. The microcomputer 24 serves as a switching control means for detecting a ring back tone and switching a telephone line 50 from the telephone set terminals 41 to 43 to the facsimile section 30 when the transmission original is set.

Figure 3:
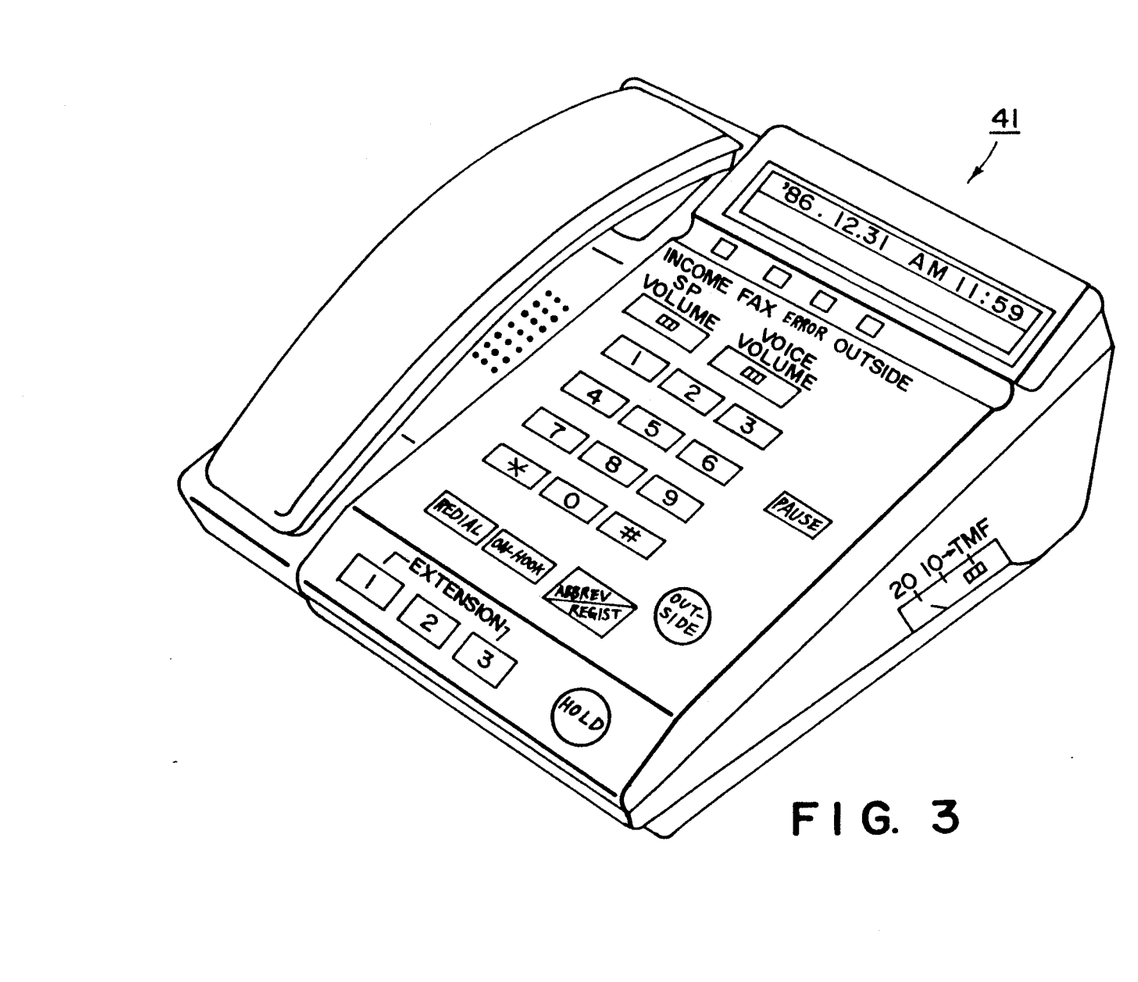
FIG. 3 is a perspective view showing a telephone set terminal in the first embodiment.

FIG. 3 shows an arrangement of the telephone set terminal 41 in the first embodiment.

The telephone set terminals 42 and 43 are arranged in the same manner as in the telephone set terminal 41.

The operation of the first embodiment will be described below.

Figure 2:
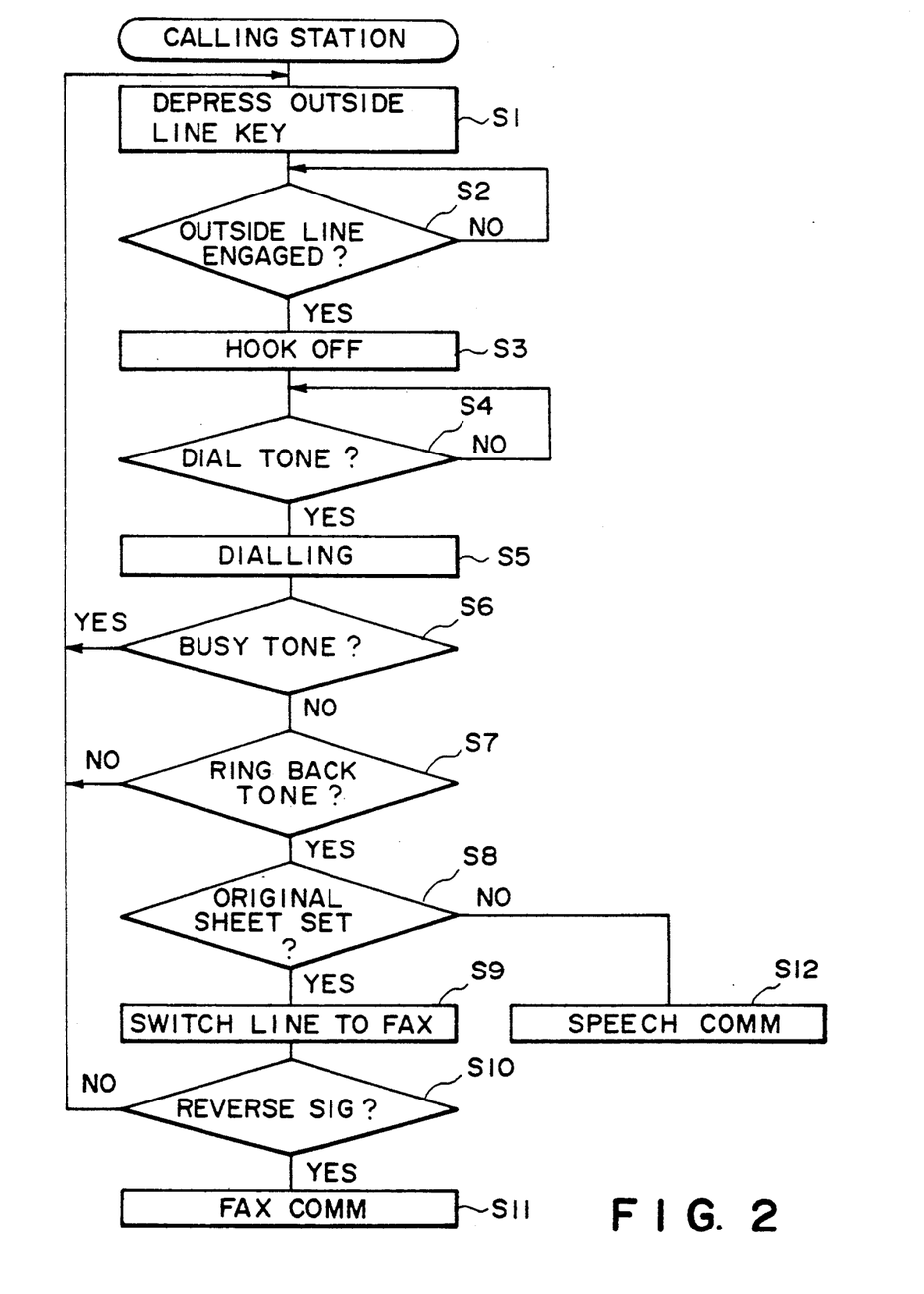
FIG. 2 is a flow chart for explaining control operation of a controller in the first embodiment.

FIG. 2 is a flow chart for explaining the operation of the first embodiment.

A calling station uses one of the telephone set terminals 41 to 43. An operator depresses an outside line key arranged in the selected telephone set terminal to engage the telephone set terminal with the outside line (S1 and S2). Assume that the telephone set terminal 41 is used for calling. When the outside line is engaged with the telephone set terminal 41, a message "OUTSIDE LINE OK" is displayed on a display unit in the telephone set terminal 41. After the operator reads this message, he picks up a handset, hears a dial tone representing a state wherein a dial signal can be accepted by the switching circuit 23, and then dials a telephone number (S3, S4, and S5).

If a line is not busy, the operator does not hear a busy tone (S6) but can hear a ring back tone as a tone for calling the partner. The ring back tone detector circuit 22 detects the ring back tone (S7). The reader unit 36 detects whether the transmission original is set in the reader unit 36 (S8). If YES in step S8, the telephone line 50 is swithced to the facsimile section 30 (S9). When a reverse signal (polarity reverse signal) is received (S10), facsimile communication is started (S11).

However, if the transmission original is not set (S8), normal speech communication is performed (S12).

When facsimile communication is started (S11), a message "FAX COMMUNICATION" is displayed on the telephone set terminal 41. The operator reads this message and hangs up the phone.

When the microcomputer 24 receives a ring back tone detection signal from the detector circuit 22, the microcomputer 24 requests to the CPU 37 in the facsimile section 30 a signal representing the presence/absence of the transmission original. When the CPU 37 receives this request signal, it receives an original presence/absence signal from the reader unit 36. The original presence/absence signal is sent to the microcomputer 24. When the microcomputer 24 receives the transmission presence signal, the microcomputer 24 causes the switching circuit 23 to switch the telephone line 50 from the telephone line terminal 41 to the facsimile section 30.

In the above embodiment, the facsimile start key is omitted from the telephone set terminal. The ring back tone detector circuit 22 is arranged in place of the facsimile start key.

As described above, when facsimile transmission is performed, the operator dials the telephone number of the partner at the selected telephone set terminal and need not operate other keys, thereby simplifying the transmission operations. For example, if the facsimile section 30 is separated from the telephone set terminals 41 to 43 and the original is set in the reader unit 36 in the facsimile section 30, the operator located at the telephone set terminal need not walk to the facsimile section 30 for facsimile transmission. Therefore, facsimile transmission can be performed even if the operator is located near the telephone set terminal.

A second embodiment of the present invention will be described below.

Figure 4:
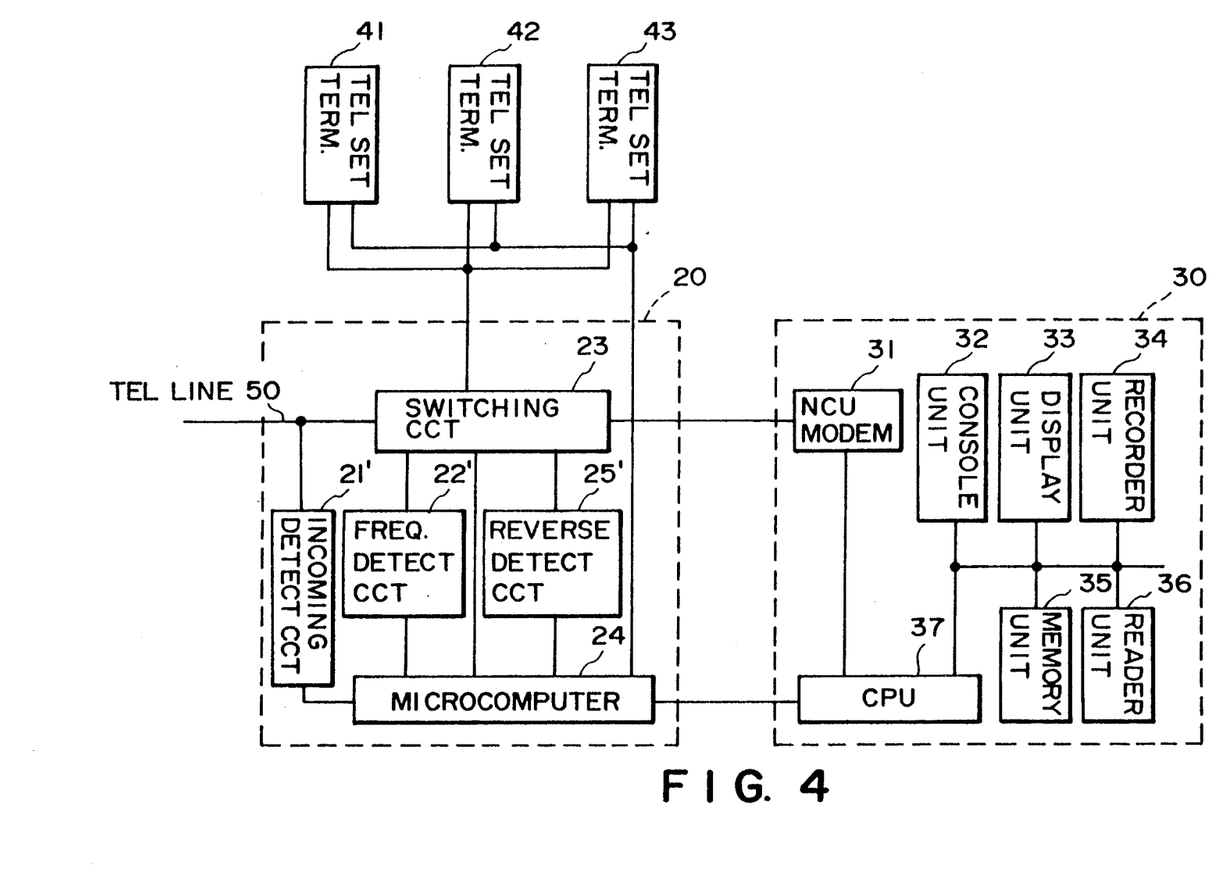
FIG. 4 is a block diagram of a data communication apparatus according to a second embodiment of the present invention.

FIG. 4 is a block diagram showing an arrangement of the second embodiment. The same reference numerals as in FIG. 1 denote the same parts in FIG. 4.

A line control section 20 includes an incoming detector circuit 21' for detecting an incoming call from a telephone line 50, and a frequency detector circuit 22' for detecting a facsimile identification signal from the partner. The frequency detector circuit 22' serves as a facsimile identification signal detecting means.

A reverse detector circuit 25' detects the reverse of the polarity of the line 50.

A telephone set terminal 41 in the second embodiment is the same as that in FIG. 3.

The operation of the second embodiment will be described below.

Figure 5:
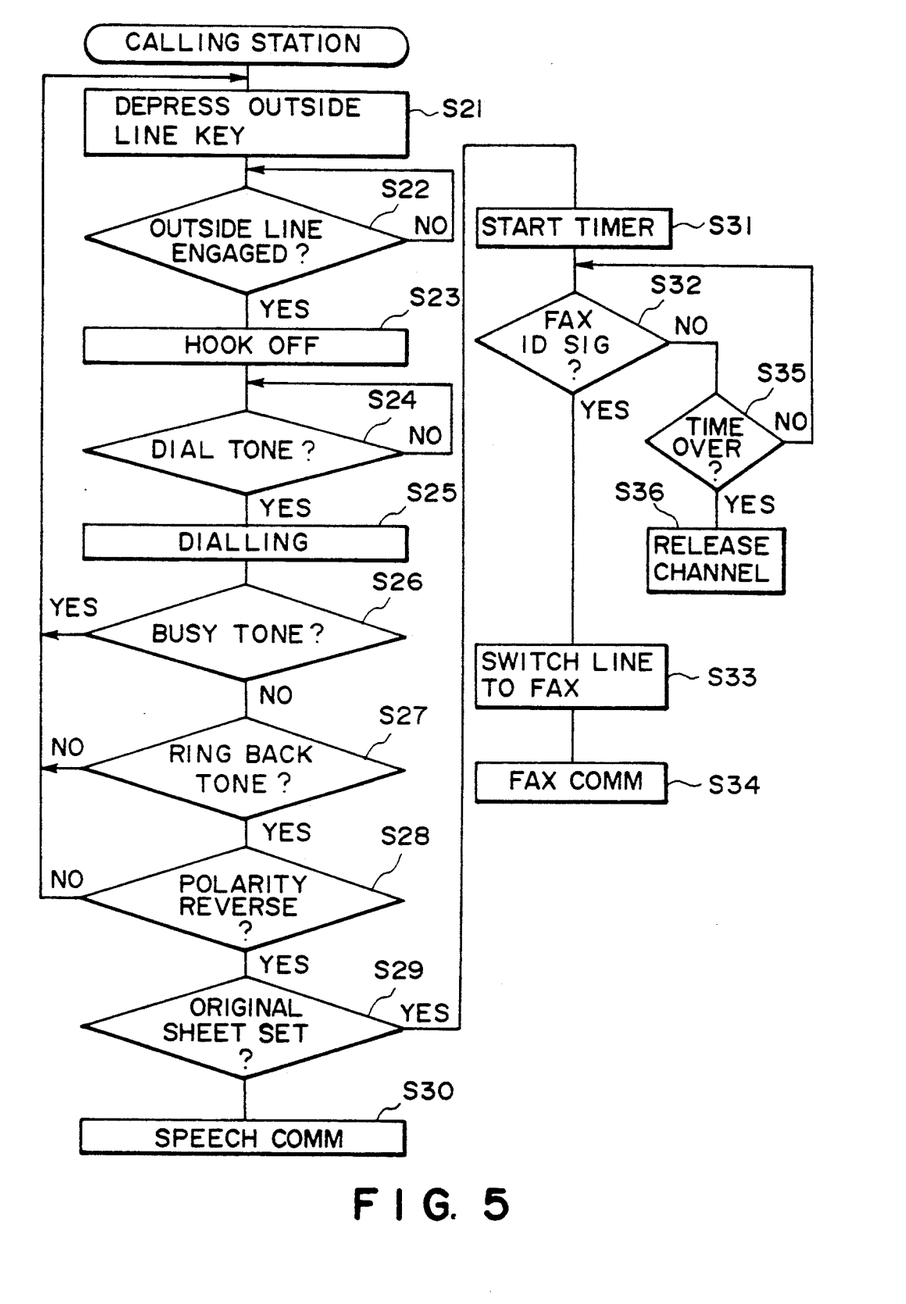
FIG. 5 is a flow chart for explaining control operation of a controller in the second embodiemnt.

FIG. 5 is a flow chart showing an operation of the second embodiment.

An operator at a calling station uses one of the telephone set terminals 41 to 43 and depresses an outside line key arranged in the selected telephone set terminal to engage it with the outside line (S21 and S22). Assume that the telephone set terminal 41 is used for calling. When the outside line is engaged with the telephone set terminal 41, a message "OUTSIDE LINE OK" is displayed on a display unit in the telephone set terminal 41. After the operator reads this message, he picks up a handset, hears a dial tone representing a state wherein a dial signal can be accepted by the switching circuit 23, and then dials a telephone number (S23, S24, and S25).

If a line is not busy, the operator does not hear a busy tone (S26) but can hear a ring back tone as a tone for calling the partner. The ring back tone detector circuit 22' detects the ring back tone (S27).

When the ring back tone is detected and the reverse of the polarity can be detected (S28), the reader unit 36 detects that the transmission original has been set in the reader unit 36 (S29). However, if the transmission original is not set, normal speech communication is performed (S30).

When the transmission original is set, a timer having a predetermined timer time is started (S31). If the frequency detector circuit 22' detects a facsimile identification signal within the timer time (S32), the telephone line 50 is switched to the facsimile section 30 (S33), and facsimile communication is performed (S34). When facsimile communication is started, a message "FAX COMMUNICATION" is displayed on the telephone set terminal 41. The operator reads this message and hangs up the phone.

However, if the facsimile identification signal cannot be detected within the timer time (S35), the telephone set terminal 41 is disengaged from the telephone line 50 (S36).

When the microcomputer 24 receives a ring back tone detection signal from the detector circuit 22' and reverse detection signal from the reverse detector circuit 25', the microcomputer 24 requests to the CPU 37 in the facsimile section 30 a signal representing the presence/absence of the transmission original. When the CPU 37 receives this request signal, it fetches an original presence/absence signal from the reader 36 and sends it to the microcomputer 24. When the microcomputer 24 receives a transmission original presence signal, the microcomputer 24 causes the timer to start. When the microcomputer 24 receives a facsimile identification signal from the frequency detector circuit 22', the microcomputer 24 causes the switching circuit 23 to switch the telephone line 50 from the telephone set terminal 41 to the facsimile section 30.

In the second embodiment, the facsimile start key is omitted from the telephone set terminal. The frequency detector circuit 22' is arranged in place of the facsimile start key.

As described above, when facsimile transmission is performed, the operator dials the telephone number of the partner at the selected telephone set terminal and need not operate other keys, thereby simplifying the transmission operations. For example, if the facsimile section 30 is separated from the telephone set terminals 41 to 43 and the original is set in the reader unit 36 in the facsimile section 30, the operator located at the telephone set terminal need not walk to the facsimile section 30 for facsimile transmission. Therefore, facsimile transmission can be performed even if the operator is located near the telephone set terminal.

According to the embodiments described above, in a communication system wherein a plurality of telephone set terminals can be connected to a non-telephone terminal incorporating a facsimile section and a line control section, operations for facsimile transmission can be simplified.

In the above embodiment, the microcomputer checks if the original is set in the reader unit 36 of the facsimile section after the operator dials the partner. However, image data to be transmitted may be stored in the memory unit 35 beforehand, the partner's telephone number may be dialed, and it may be then checked whether the image data to be transmitted is stored in the memory unit 35.

In the above embodiment, the plurality of telephone set terminals and the facsimile system share the common transmission line. However, the plurality of telephone set terminals need not be used, but only one telephone set terminal may be used. In addition, the data communication apparatus is not limited to the facsimile system, but may be replaced with an apparatus (e.g., a teletex or a wordprocessor) for transmitting code data. In this case, it must be checked if the transmission data is stored in the memory unit 35.

The present invention is not limited to the particular embodiments described above. Various changes and modifications may be made within the spirit and scope of the invention.

What is claimed is:

1. A data transmission apparatus comprising:
    data transmitting means for performing data transmission;
    speech communicating means for performing speech communication;
    data detecting means for detecting whether transmission data is present in said data transmitting means while said speech communicating means is engaged with said communication line; and
    switching means switches a communication line from said speech communicating means to said data transmitting means when said data detecting means detects, without obtaining any operator's instruction by a manual switch, that the transmission data is present.

2. An apparatus according to claim 1, wherein said data transmitting means transmits the transmission data present therein when said data transmitting means is switched to engage with said communication line.

3. A apparatus according to claim 1, wherein said data transmitting means comprises reading means for reading an original, and said data detecting means detects whether the original is present in said reading means.

4. An apparatus according to claim 1, wherein said transmitting means comprises memory means for storing the transmission data, and said data detecting means detects whether the transmission data is stored in said memory means.

5. An apparatus according to claim 1, wherein said switching means selectively connects said data transmitting means or said speech communicating means to said communication line for performing data or speech communication, respectively.

6. An appatatus according to claim 1, wherein said data transmitting means performs a facsmile communication.

7. An apparatus according to claim 1, wherein said switching means comprises signal detecting means for detecting whether a specific signal from said communication line is received, and said switching means switches said communication line from said speech communicating means to said data transmitting means when said signal detecting means detects the specific signal.

8. An apparatus according to claim 7, wherein said switching means switches the communication line from said speech communicating means to said data transmitting means when said signal detecting means detects that the specific signal is received and said data detecting means detects that the transmission data is present.

9. An apparatus according to claim 7, wherein the specific signal represents a line connection.

10. An apparatus according to claim 9, wherein the specific signal includes a ring back tone.

11. An apparatus according to claim 9, wherein the specific signal includes a polarity reverse signal.

12. An apparatus according to claim 7, wherein the specific signal includes a signal for a data communication.

13. An apparatus according to claim 12, wherein the specific signal includes a facsimile identification signal.

14. An apparatus according to claim 1, further comprising a plurality of speech communicating means, and wherein said switching means performs switching between said plurality of speech communicating means and said data communicating means.

15. An apparatus according to claim 1, wherein said speech communicating means comprises calling means for calling a desired partner so as to connect said communication line to the desired partner while said speech communicating means is engaged with said communication line.

16. An apparatus according to claim 15, wherein said switching means switches said communication line from said speech communicating means to said data transmitting means, after said calling means calls the desired partner.

17. A communication system having a plurality of telephone set terminals and a non-telephone terminal incorporating data communication means, comprising:
    data detection means for detecting that transmission data is present in said non-telephone terminal while one of said plurality of telephone set terminals is engaged with a communication line; and
    switching means for switching, without obtaining any operator's instruction by a manual switch, the communication line from the one of said plurality of telephone set terminals to said data communication means when the transmission data is present.

18. A system according to claim 17, wherein said non-telephone terminal comprises read means for reading an original, and said data detection means detects whether the original is present in said read means.

19. A system according to claim 17, wherein said non-telephone terminal comprises memory means for storing the transmission data, and said data detection means detects whether the transmission data is stored in said memory means.

20. A system according to claim 17, wherein said data communication means transmits the transmission data present therein when said data communication means is switched to engage with said communication line.

21. A system according to claim 17, wherein said switching means selectively connects said data communication means or said speech communication means to said communication line for performing data or speech communication, respectively.

22. A system according to claim 17, wherein said speech communication means comprises calling means for calling a desired partner so as to connect said communication line to the desired partner while said speech communication means for engaged with said communication line.

23. A system according to claim 22, wherein said switching means switches said communication line from said speech communication means to said data communication means, after said calling means calls the desired partner.

24. A system according to claim 17, wherein said data transmitting means performs a facsimile communication.

25. A system according to claim 17, wherein said switching means comprises signal detection means for detecting whether a specific signal from said communication line is received, and said switching means switches said communication line from said speech communication means to said data communication means when said signal detection means detects the specific signal.

26. A system according to claim 25, wherein said switching means switches said communication line from said speech communication means to said data communication means when said signal detection means detects that the specific signal is received and said data detection means detects that the transmission data is present.

27. A system according to claim 25, wherein the specific signal represents a line connection.

28. A system according to claim 27, wherein the specific signal includes a ring back tone.

29. A system according to claim 27, wherein the specific signal includes a polarity reverse signal.

30. A system according to claim 25, wherein the specific signal includes a signal for a data communication.

31. A system according to claim 30, wherein the specific signal includes a facsimile identification signal.

32. A data transmission apparatus comprising:
data transmission means for preforming data transmission;
a plurality of speech communication means for performing speech communication, each respectively incorporating indication means for indicating engagement of a communication line and input means for inputting a dial number of a desired partner so as to connect said communication line to the desired partner;
signal detection means for detecting whether a specific signal is received from said communication line; and
switching means for switching said communication line from one of said speech communication means inputting the dial number to said data transmission means when said signal detection means detects that the specific signal is received while said speech communication means is enabled to perform the speech communication,
wherein said data transmission means performs the data transmission when said data transmission means is switched to engage with said communication line.

33. An apparatus according to claim 32, wherein said switching means selectively connects said data transmission means or said speech communication means to said communication line for performing the data or speech communication, respectively.

34. An apparatus according to claim 32, wherein said switching means performs a switching operation without obtaining any operator's instruction by a manual switch.

35. An apparatus according to claim 32, wherein said speech communication means comprises a handset, and a state wherein said speech communication means is enabled to perform the speech communication corresponds that said handset is in an off-hook state.

36. An apparatus according to claim 32, wherein said switching means comprises data detection means for detecting whether transmission data is present in said data transmission means, and said switching means switches said communication line from said speech communication means to said data transmission means when said data detection means detects that the transmission data is present.

37. An apparatus according to claim 36, wherein said switching means switches said communication line from said speech communication means to said data transmission means when said signal detection means detects that the specific signal is received and said data detection means detects that the transmission data is present.

38. An apparatus according to claim 36, wherein said data transmission means comprises read means for reading an original, and said data detection means detects whether the original is present in said read means.

39. An apparatus according to claim 36, wherein said data transmission means comprises memory means for storing the transmission data, and said data detection means detects whether the transmission data is stored in said memory means.

40. An apparatus according to claim 32, wherein the specific signal represents a line connection.

41. An apparatus according to claim 40, wherein the specific signal includes a ring back tone.

42. An apparatus according to claim 40, wherein the specific signal includes a polarity reverse signal.

43. An apparatus according to claim 32, wherein the specific signal includes a signal for the data communication.

44. An apparatus according to claim 43, wherein the specific signal includes a facsimile identification signal.

45. An apparatus according to claim 32, wherein said data transmission means performs a facsimile communication.

46. A communication system having a non-telephone terminal incorporating data communication means and a plurality of telephone set terminals, each of said plurality of telephone set terminals respectively incorporating input means for inputting a dial number of a desired partner so as to connect a communication line to the desired partner, comprising:
signal detection means for detecting whether a specific signal is received from said communication line while one of said telephone set terminal, upon inputting the dial number is engaged with said communication line; and switching control means for switching said communication line from said telephone set terminal inputting the dial number to said data communication means when reception of the specific signal is detected, wherein said data communication means performs data transmission when said data communication means is switched to engage with said communication line.

47. A system according to claim 46, wherein said switching control means comprises data detection means for detecting whether transmission data is present in said data communication means, and said switching control means switches said communication line from said speech communication means to said data communication means when said data detection means detects that the transmission data is present.

48. A system according to claim 47, wherein said non-telephone terminal comprises read means for reading an original, further comprising means for detecting whether the original is present in said read means.

49. A system according to claim 47, wherein said non-telephone terminal comprises memory means for storing the transmission data, and said means for detecting detects whether the transmission data is stored in said memory means.

50. A system according to claim 47, wherein said switching control means switches said communication line from said speech communication means to said data communication means when said signal detection means detects that the specific signal is received and said data detection means detects that the transmission data is present.

51. A system according to claim 46, wherein said switching control means switches said telephone line from one of said plurality of telephone set terminals to said data communication means when reception of the specific signal is detected while said speech communication means is enabled to perform a speech communication.

52. A system according to claim 51, wherein said speech communication means comprises a handset, and a state wherein said speech communication means is enabled to perform the speech communication corresponds that said handset is in an off-hook state.

53. A system according to claim 46, wherein said switching control means performs a switching operation without obtaining any operator's instruction by a manual switch.

54. A system according to claim 46, wherein the specific signal represents a line connection.

55. A system according to claim 54, wherein the specific signals includes a ring back tone.

56. A system according to claim 54, wherein the specific signal includes a polarity reverse signal.

57. A system according to claim 46, wherein the specific signal includes a signal for a data communication.

58. A system according to claim 57, wherein the specific signal includes a facsimile identification signal.

59. A system according to claim 46, wherein said data communication means performs a facsimile communication.

60. A system according to claim 46, wherein said switching control means selectively connects said data communication means or said speech communication means to said communication line for performing data or speech communication, respectively.

61. A line switching method of a facsimile communication apparatus, wherein either an external telephone set or a built-in facsimile communication unit is selectively connected to a communication line, said method comprising the steps of:

connecting the telephone set to the communication line in accordance with a call request by the telephone set;

connecting the facsimile communication unit to the communication line, if a specific signal which is sent by another facsimile apparatus which responds a call by the telephone set is detected on the communication line in a state where the telephone set is connected to the communication line and in an off-hook state; and making the facsimile communication unit start a facsimile communication with the other facsimile apparatus.

62. A method according to claim 61, wherein, in said facsimile communication unit connecting step, a facsimile identification signal is detected as a specific signal.

63. A method according to claim 61, wherein, in said facsimile communication unit connecting step, a ring-back tone is further detected for connecting the facsimile communication unit to the communication line.

64. A method according to claim 61, wherein, in said telephone set connecting step, the telephone set and the another facsimile apparatus are connected to each other through the communication line.

65. A facsimile communication apparatus comprising:
facsimile communication means;
connection means for selectively connecting either a telephone set or said facsimile communication means to a communication line;
detection means for detecting a specific signal which is sent by another facsimile apparatus on said communication line; and
control means for controlling, on the basis of detection of the specific signal by said detection means in a state where said telephone set is connected to said communication line by said connection means and in an off-hook state, said connection means such that said facsimile communication means is connected to said communication line.

66. An apparatus according to claim 65, wherein said control means further makes said facsimile communication means start a facsimile communication.

67. An apparatus according to claim 65, wherein said connecting means connects the telephone set to said communication line in accordance with an operation's request.

68. An apparatus according to claim 65, wherein said connecting means connects, to said telephone set, another facsimile apparatus which responds to a call by said telephone set, through said communication line.

69. An apparatus according to claim 65, wherein said connecting means connects said another facsimile apparatus to said telephone set, through said communication line.

70. An apparatus according to claim 65, wherein said facsimile communication means performs a facsimile transmission.

71. An apparatus according to claim 65, wherein said detection means further detects a ring-back tone.

72. An apparatus according to claim 65, wherein said detection means detects a facsimile identification signal.

73. A line switching method of a facsimile communication apparatus, wherein either an external telephone set or a built-in facsimile communication unit is selectively connected to a communication line, said method comprising the steps of: connecting the telephone set to the communication line;
  connecting the facsimile communication unit to the communication line, if a specific signal which is sent by another facsimile apparatus is detected from the communication line to which the telephone set is connected in a state where the telephone set is an off-hook state; and
  making the facsimile communication unit start a facsimile communication.

74. A method according to claim 73, wherein, in said telephone set connecting step, the telephone set and the another facsimile apparatus are connected to each other through the communication line.

75. A method according to claim 73, wherein, in said facsimile communication unit connecting step, a facsimile identification signal is detected as the specific signal.

76. A method to claim 73, wherein, in said facsimile communication unit connecting step, a ring-back tone is further detected for connecting the facsimile unit to the communication line.

77. A method according to claim 73, wherein, in said making step, the facsimile communication unit is caused to preform facsimile transmission.

78. A method according to claim 73, wherein, in said telephone set connecting step, the telephone set and the communication line are connected to each other in accordance with an operator's request.

79. A method according to claim 75, wherein said facsimile communication unit connecting step further comprises the step of performing dialing by the telephone set in accordance with an operator's request, and the specific signal from another facsimile apparatus is detected responsive to the dialing in said dialing step.

* * * * *

UNITED STATES PATENT AND TRADEMARK OFFICE
CERTIFICATE OF CORRECTION

PATENT NO. : 5,153,912
DATED : October 6, 1992
INVENTOR(S) : KENZO SAKAKIBARA, ET AL.

It is certified that error appears in the above-identified patent and that said Letters Patent is hereby corrected as shown below:

IN [57] ABSTRACT

"72 Claims" should read --79 Claims--.

COLUMN 6

Line 7, "facsimle" should read --facsimile--.

COLUMN 7

Line 16, "for" should read --is--.
Line 52, "preforming" should read --performing--.

COLUMN 10

Line 13, "responds" should read --responds to--.
Line 52, "operation's" should read --operator's--.

UNITED STATES PATENT AND TRADEMARK OFFICE
CERTIFICATE OF CORRECTION

PATENT NO. : 5,153,912
DATED : October 6, 1992
INVENTOR(S) : KENZO SAKAKIBARA, ET AL.

It is certified that error appears in the above-identified patent and that said Letters Patent is hereby corrected as shown below:

<u>COLUMN 12</u>

Line 15, "75" should read --73--.

Signed and Sealed this

Ninth Day of November, 1993

Attest:

BRUCE LEHMAN

Attesting Officer   Commissioner of Patents and Trademarks